(12) United States Patent
Saiu et al.

(10) Patent No.: US 9,183,184 B2
(45) Date of Patent: Nov. 10, 2015

(54) CONFIGURABLE TEMPLATES FOR SELF-SERVICE SUPPLIER REGISTRATION

(71) Applicant: ORACLE INTERNATIONAL CORPORATION, Redwood Shores, CA (US)

(72) Inventors: Joanne Saiu, San Jose, CA (US); Weishin Yin, Cupertino, CA (US); June Yee, Orinda, CA (US); Alexandra Dhillon, Dublin, CA (US); Purna Prasad Maddukuri, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 285 days.

(21) Appl. No.: 13/950,578

(22) Filed: Jul. 25, 2013

(65) Prior Publication Data
US 2014/0095970 A1    Apr. 3, 2014

Related U.S. Application Data

(60) Provisional application No. 61/707,255, filed on Sep. 28, 2012.

(51) Int. Cl.
| | |
|---|---|
| *G06F 17/00* | (2006.01) |
| *G06F 17/21* | (2006.01) |
| *G06F 17/24* | (2006.01) |
| *G06Q 30/06* | (2012.01) |

(52) U.S. Cl.
CPC ............ *G06F 17/211* (2013.01); *G06F 17/243* (2013.01); *G06Q 30/0605* (2013.01); *G06Q 30/0641* (2013.01)

(58) Field of Classification Search
CPC ..................................................... G06F 17/243
See application file for complete search history.

(56) References Cited

U.S. PATENT DOCUMENTS

| | | | |
|---|---|---|---|
| 5,594,858 A * | 1/1997 | Blevins ......................... | 715/747 |
| 7,093,285 B2 * | 8/2006 | Singhani et al. ................. | 726/8 |

(Continued)

FOREIGN PATENT DOCUMENTS

EP    1639456 A2    3/2006

OTHER PUBLICATIONS

Siemens, *Siemens Shared Services: The Power of Partners*. 2008. Retrieved from https://www.smed.com/SupplierStandards/IOLUserManualv402.pdf. Nov. 2012.

*Primary Examiner* — Laurie Ries
(74) *Attorney, Agent, or Firm* — Kilpatrick Townsend & Stockton LLP

(57) ABSTRACT

Embodiments of the present invention include a configurable template definition which improves the self-service supplier registration and update process by providing a tailored request to match the needs for the particular type of supplier and collect all the relevant information from them. According to one embodiment, a template page can be made available where the administrator can specify which attributes or attribute groups can be applicable for each type of supplier when registering or updating their data. Profile questions can be selected from the master list and associated to the template. The registration process can then be coded to hide or show individual attributes or groups of attributes and individual profile questions based on the selection in the related template.

20 Claims, 6 Drawing Sheets

(56) References Cited

U.S. PATENT DOCUMENTS

| | | | |
|---|---|---|---|
| 7,805,669 B2* | 9/2010 | Sattler et al. | 715/223 |
| 7,925,973 B2* | 4/2011 | Allaire et al. | 715/248 |
| 8,065,202 B1* | 11/2011 | Ballaro et al. | 705/27.2 |
| 2003/0055689 A1* | 3/2003 | Block et al. | 705/5 |
| 2006/0053029 A1* | 3/2006 | Butler | 705/1 |
| 2006/0059024 A1* | 3/2006 | Bailey et al. | 705/5 |
| 2006/0136810 A1* | 6/2006 | Truong et al. | 715/507 |
| 2006/0293967 A1* | 12/2006 | Deluca et al. | 705/26 |
| 2007/0174141 A1* | 7/2007 | Suda et al. | 705/27 |
| 2008/0177708 A1* | 7/2008 | Ayyar et al. | 707/3 |
| 2008/0201254 A1* | 8/2008 | Sharma et al. | 705/37 |
| 2008/0276182 A1* | 11/2008 | Leow | 715/740 |
| 2008/0300959 A1* | 12/2008 | Sinha et al. | 705/10 |
| 2009/0299781 A1* | 12/2009 | Dattathreya | 705/7 |
| 2010/0280962 A1* | 11/2010 | Chan | 705/301 |
| 2012/0144421 A1* | 6/2012 | Kuroda et al. | 725/36 |

* cited by examiner

CONFIGURABLE TEMPLATES FOR SELF-SERVICE SUPPLIER REGISTRATION

CROSS-REFERENCES TO RELATED APPLICATIONS

The present application claims benefit under 35 USC 119(e) of U.S. Provisional Application No. 61/707,255, filed on Sep. 28, 2012 by Saiu et al. and entitled "Configurable Templates for Self Service Supplier Registration," of which the entire disclosure is incorporated herein by reference for all purposes.

BACKGROUND OF THE INVENTION

Embodiments of the present invention relate generally to methods and systems for registering participants in a process managed by an enterprise application and more particularly to supporting self-registration of suppliers, bidders, or other registrants.

Various types of enterprise applications support interactions between parties such as buyers and sellers. For example, various enterprise applications provide functions related to purchasing, accounts payable, procurement, strategic sourcing, services procurement, settlements, etc. These applications typically require suppliers or bidders to register before they can be available within the systems or applications and allowed to participate in transactions. Authorization for supplier creation and maintenance previously would typically be limited to a select few individuals within the organization. This created a burden for those individuals due to the potentially large volume of suppliers that might need to be managed. Hence, there is a need for improved methods and systems for allowing registrants such as suppliers, bidders, etc. to self-register.

BRIEF SUMMARY OF THE INVENTION

Embodiments of the invention provide systems and methods for allowing registrants such as suppliers, bidders, etc. to self-register. According to one embodiment, supporting self-registration of registrants for availability in a process managed by an enterprise application can comprise maintaining a set of pre-defined templates related to an on-boarding process of the enterprise application, each template comprising a set of information that is fixed and a set of information that is configurable. The set of information that is configurable can comprise one or more of information related to determining an identity of the registrant, information related to determining an address of the registrant, information related to determining contact information for the registrant, information related to determining payment information for the registrant, information related to determining product categories for the registrant, or information related to terms and conditions for the registrant.

One or more of the pre-defined templates can be updated with user defined information to create one or more configured templates, each of the configured templates related to a particular context. For example, updating one or more of the pre-defined templates can comprise selecting fields of the information that is configurable to either hide or present to a registrant during the on-boarding process. Additionally or alternatively, updating one or more of the pre-defined templates can comprise changing fields of the information that is configurable. In either case, updating one or more of the pre-defined templates with user defined information to create one or more configured templates can comprise determining a context for registration to be updated, selecting one or more of the pre-defined templates based on the determined context to be updated, presenting a user interface for configuring the selected one or more pre-defined templates, receiving user inputs through the user interface and related to at least some of the set of information that is configurable in the one or more selected pre-defined templates, generating the one or more configured templates based on the one or more selected pre-defined templates and the received user inputs, and saving the generated one or more configured templates.

In response to a request from a registrant to register, one of the configured templates can be selected based on a context in which the request from the registrant is made. For example, the request from the registrant can be received in response to an invitation to register sent to the registrant. In another example, the request from the registrant can be self-initiated by the registrant. The context in which the request is made can be based on one or more of a location of the registrant, a type of the registrant, an industry of the registrant, whether the registrant was invited to register, or whether the registrant is self-initiating the request to register.

The on-boarding process can be performed using the selected configured template. The on-boarding process can comprise a sequence of pre-defined train stops for collecting information from the registrant making the request to register and the information collected at each train stop can depend upon the set of information that is fixed and a set of information that is configurable within the template. Performing the on-boarding process using the selected configured template can comprise receiving the request from the registrant, determining the context of the request based on one or more of the request, the registrant making the request, or a manner in which the request is initiated, selecting the configured templates based on the determined context of the request, collecting registration data from the registrant through the on-boarding process and based on the selected configured template, submitting the registration data collected from the registrant during the on-boarding process for approval, and upon approval of the registration data, adding the registrant as available in the process managed by an enterprise application.

In some cases, performing the on-boarding process using the selected configured template can comprise, prior to submitting the registration data collected from the registrant during the on-boarding process for approval, detecting a request from the registrant to pause the on-boarding process. In response to the request from the registrant to pause the on-boarding process, collected registration data can be saved, an identifier can be issued to the registrant, and the on-boarding process can be stopped. In response to a request from the registrant to restart the paused on-boarding process that includes the issued identifier, the on-boarding process can be restarted with the saved collected registration data. Additionally or alternatively, performing the on-boarding process using the selected configured template can comprise, in response to a failure to approve the submitted registration data collected from the registrant during the on-boarding process, initiating a collaboration with the registrant, collecting additional registration data from the registrant through the collaboration, and re-submitting the registration data collected from the registrant during the on-boarding process with the additional information for approval.

DETAILED DESCRIPTION OF THE INVENTION

Figure 1:
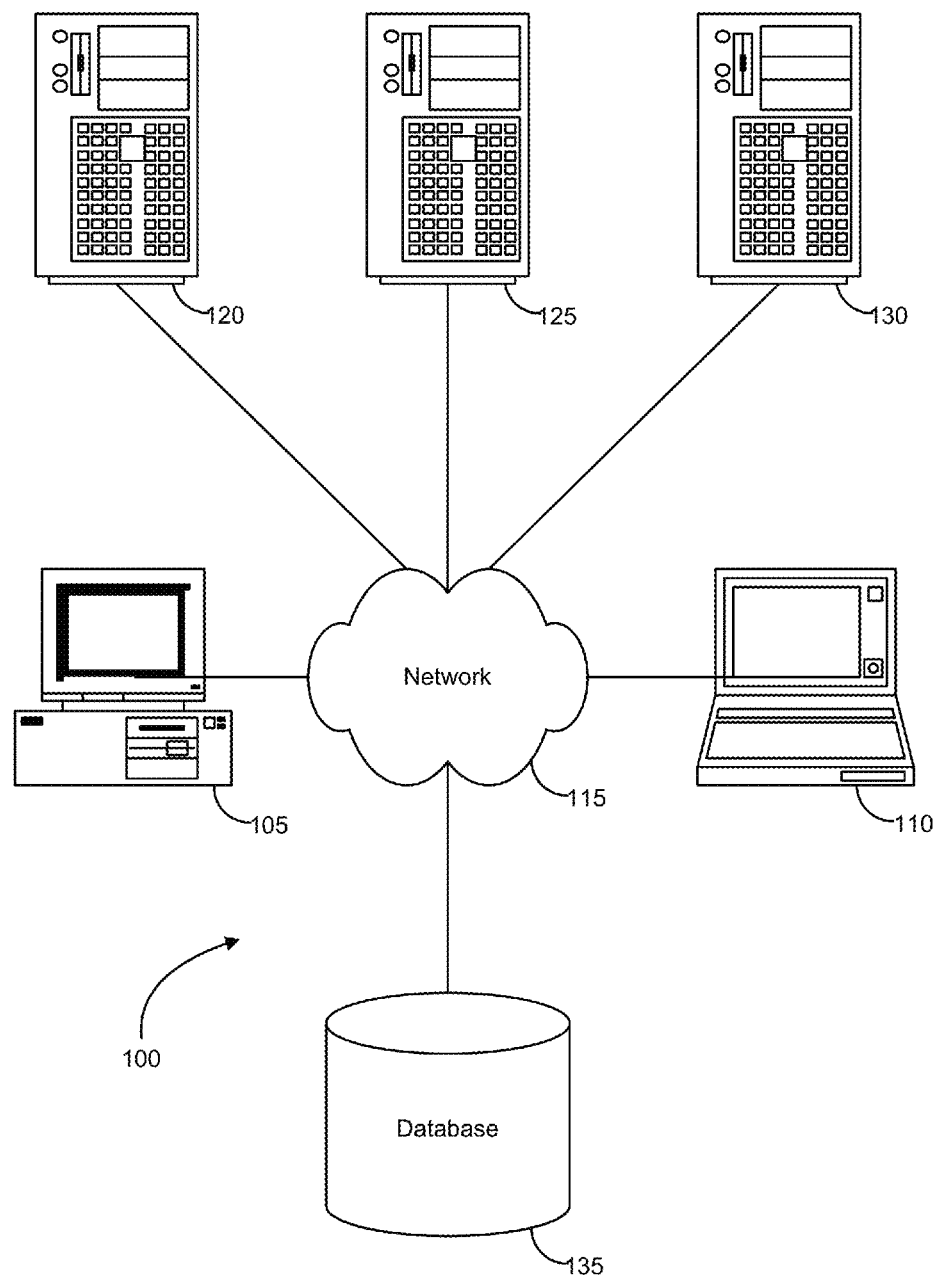
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present invention include a configurable template definition which improves the self-service supplier registration and update process by providing a tailored request to match the needs for the particular type of supplier and collect all the relevant information from them. According to one embodiment, a template page can be made available where the administrator can specify which attributes or attribute groups can be applicable for each type of supplier when registering or updating their data. Profile questions can be selected from the master list and associated to the template. The registration process can then be coded to hide or show individual attributes or groups of attributes and individual profile questions based on the selection in the related template. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 120, 125, 130. Alternatively, it may be remote from any or all of the computers 105, 110, 120, 125, 130, and/or in communication (e.g., via the network 115) with one or more of these. In a particular set of embodiments, the database 135 may reside in a storage-area network ("SAN") familiar to those skilled in the art. Similarly, any necessary files for performing the functions attributed to the computers 105, 110, 120, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
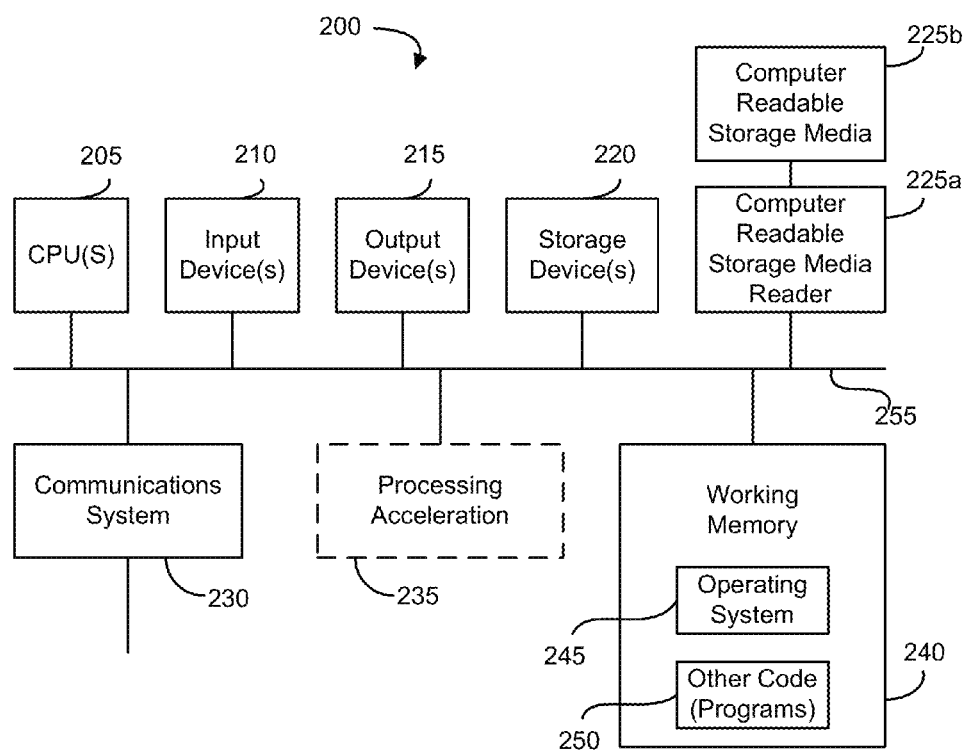
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

As noted above, authorization for supplier creation and maintenance previously would typically be limited to a select few individuals within the organization. This created a burden for those individuals due to the potentially large volume of suppliers that might need to be managed. With embodiments of the present invention, the burden is significantly reduced for the few individuals responsible for overseeing the supplier information. Now they can simply review and approve/deny what others have submitted rather than being responsible for all of the data input. Since self-service users are often casual users without extensive knowledge of the system, they are presented with an easy to use format that guides them easily through the process, with only relevant information being collected from each user.

Embodiments of the present invention include a configurable template definition which improves the self-service supplier registration and update process by providing a tailored request to match the needs for the particular type of supplier and collect all the relevant information from them. According to one embodiment, a template page can be made available where the administrator can specify which attributes or attribute groups can be applicable for each type of supplier when registering or updating their data. Profile questions can be selected from the master list and associated to the template. The registration process can then be coded to hide or show individual attributes or groups of attributes and individual profile questions based on the selection in the related template.

Embodiments provide a streamlined and secured supplier on-boarding process that would allow prospective suppliers across the products to self-register either online or via the Excel/XML upload. Depending on the approval rules setting, requests of a new registration or change of an existing supplier profile may be routed for approval. Registrants can then be notified of the requests being either approved or rejected. Additional information may be requested, if needed, prior to making the approve/reject decision. The approved profile change requests can be updated in the supplier master. The new bidder/supplier registrations, before being routed for approval, may go through Financial Sanctions validation (OFAC) and Supplier Duplication checking, if enabled. Once the new registration requests are approved, the system can then create new bidder/supplier master records. Various additional details of embodiments of the present invention will be described below with reference to the figures.

Figure 3:
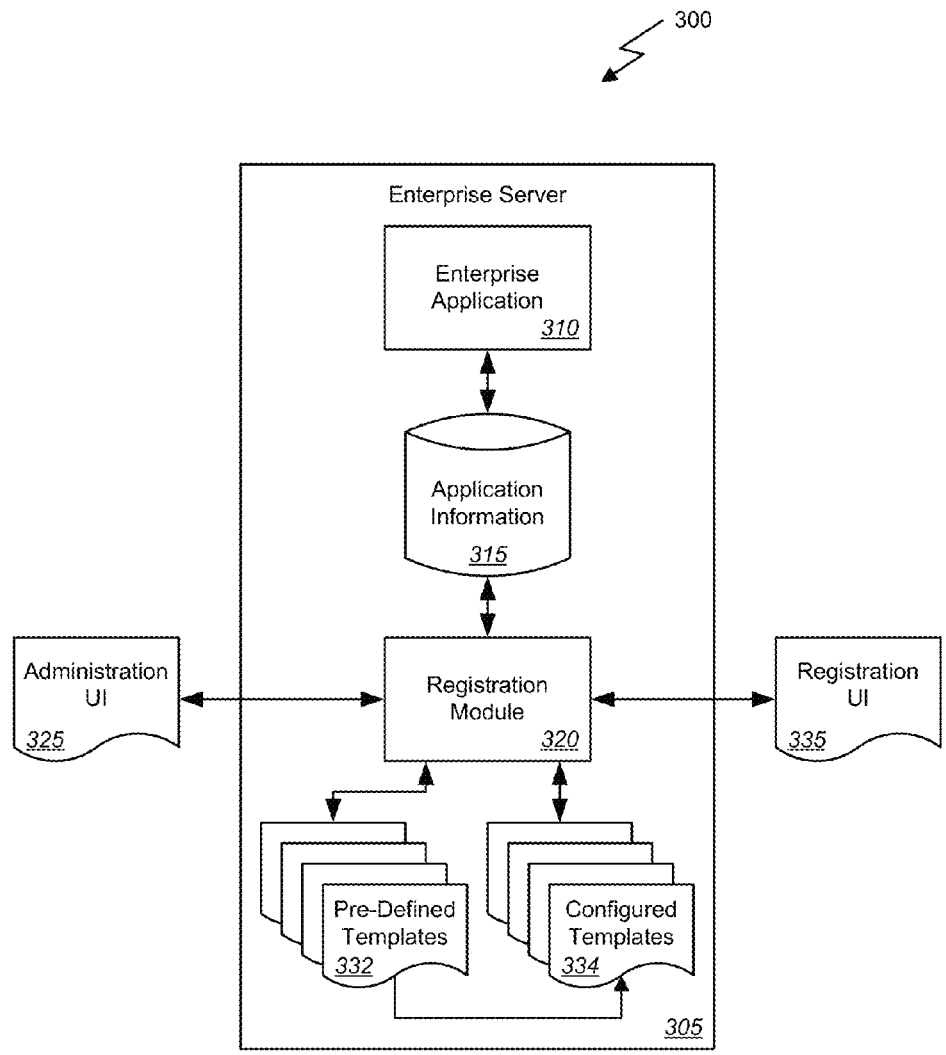
FIG. 3 is a block diagram illustrating, at a high-level, functional components of a system for supporting supplier self-service registration according to one embodiment of the present invention.

FIG. 3 is a block diagram illustrating, at a high-level, functional components of a system for supporting supplier self-service registration according to one embodiment of the present invention. As illustrated in this example, the system 300 can include an enterprise server 305 such as any of the servers or other systems described above. The enterprise server 305 can execute an enterprise application 310 including but not limited to one or more applications providing functions related to purchasing, accounts payable, procurement, strategic sourcing, services procurement, settlements, etc. using a set of application information 315 stored in a database or other repository. This application information 315 can include, for example, information related to transactions processed by the enterprise application 310 and users of the application 310 such as registered suppliers, bidders, etc.

The enterprise server can also execute a registration module 320 for registering and managing suppliers, bidders, and/or other users of the enterprise application 310. The registration module 320 can provide an administration user interface 325 through which an administrator or other authorized user can access and manage user information stored in the application information 315. According to one embodiment, the registration module 320 can also provide a registration user interface 335 through which potential suppliers, bidders, and/or other users may register with the enterprise application 310. For example, the registration user interface 335 may comprise a web page available publicly over the Internet and/or privately within an enterprise over an Intranet or other network. By accessing this interface 335, registrants, i.e., suppliers, bidders, and/or other users wishing to become registered with the enterprise application 310, can request registration and be guided through a registration process by the registration module 320.

As will be described in greater detail below, a set of pre-defined templates 332 can be provided with the enterprise application 310 and made available for use by the registration module 320. These templates 332 can include information used by the registration module 320 when executing the registration process. According to one embodiment, the registration module 320 can also be adapted to allow an administrator, manager, or other authorized user to access these templates 332, for example through the administration user interface 325 and generate a set of configured templates 334 for various conditions encountered based on the exact implementation of the enterprise application 310. Once these configured templates 334 are generated, they can be used by the registration process of the registration module 320 to, in effect, customize that process. In other words, even though the registration process has not been changed, the behavior of that process can be influenced or modified based on the configured templates 334. Thus, the registration process can be adapted to include not only allowing suppliers to register themselves and get approval but also to allow internal users that might not have proper authorizations to create suppliers and submit them for approval.

Generally speaking, embodiments of the present invention provide users of the enterprise application 310 an ability to tailor the registration process of the registration module 320 to the exact implementation of the enterprise application 310 by configuring the templates 334. So, the registration process can be the same for all users of the enterprise application 310 but the pre-defined templates 332 can be configured, e.g., by selected particular fields to hide or show, changing the contents of particular fields, adding or deleting fields or contents thereof, etc., to influence the information presented to and/or collected from a registrant during the registration process. In other words, the configured templates 334 can be defined so that multiple views of what information can be provided and/or collected for the registration process depending on a particular context, e.g., industries, geography, etc. For example, through the administration user interface 325, an administrator, manager, or other authorized user can pick and choose fields of the pre-defined templates 332 to use in the configured templates 334. In some cases, the pre-defined templates 332 may include default fields that are considered to be required and thus cannot be deleted or changed while other fields of the pre-defined templates 332 may be considered optional/selectable and/or editable. Then, depending upon selections and/or changes made to the pre-defined templates 332, the configured templates 334 can be generated and used to make the registration process tailored to a particular context. For example, a configured template 334 may be generated for a particular geography. So, in such an example, suppliers in Europe may be presented with and be asked to provide different information from those in US during the registration process. In another example, the context may be based on the registrant being internal (i.e., within the enterprise) or external (outside the enterprise) users and, in which case, external users might be asked to provide bank information.

Content of the pre-defined templates 332 can include, for example, profile questions that can be modified or even defined by the user and associated to the configured templates 334. In this way, there can be a different set of questions presented to the registrant during the registration process, e.g., manufacturing suppliers might have certain certifications that customers might want to check. In some cases, these questions can comprise a list of URLs that link back to a questionnaire which may be stored in the application information 315 or elsewhere. Then, for example, when a registrant selects a link presented in the registration user interface 335 representing a type of industry, they can be directed to a questionnaire for that industry or supplier type in addition to the pre-defined and/or selected fields in the configured template 334. Additionally or alternatively, terms and conditions can be set up in the configured templates 334 so that different terms and conditions can be selected and displayed in the registration user interface 335 based on a particular context, e.g., industry, location, etc.

Once the configured templates 334 have been defined, the registration process of the registration module can be initiated in different ways. In one case, the registration process can be initiated via invitation. For example, someone such as a buyer or manager internal to the enterprise can send email or other communication to a particular supplier, bidder, or other registrant. This communication can include a link to a registration page, i.e., the registration user interface 335. By clicking this link or otherwise navigating the registration user interface 335, the invited registrant can begin the registration process. In another case, the registration process might be available to public access. That is, the enterprise might provide a public website that includes one or more links for the registration user interface 335. By navigating to the registration user interface 335 the registrant can self-initiate the registration process.

Once initiated, the registration process can walk the registrant through different steps or "train stops" to collect different types of data based on one of the configured templates 334 that are applicable to the particular context. For example, if the registration process is started by invitation, the registrant might be asked to re-enter for validation an access code provided with or separate from the invitation. The series of train stops can, again depending upon the selected configured template, collect different information including but not limited to one or more of a name, some verifiable identification, e.g., Personal Identification Number (PIN), Dun & Bradstreet number, Employer Identification Number (EIN), etc., minority information, veteran status information, classification, industry, address and/or contact information, payment information, products, services, etc.

According to one embodiment, the registrant can then submit the registration or stop the process and save the information for later. If stopped and saved, the registrant can be given an identifying code for use later, on return to and restart of the registration process. The registrant can then later either start a new submission or re-start a previous submission with proper authentication of that code. Once the registration process is complete, the registrant can submit the collected information to an approval process.

An authorized approver can access the review, for example through the administration user interface 325, and can give approval. Once approved, the registration module can create records for the registrant in the application information 315 and can send notifications to the registrant and or other users. According to one embodiment, if questions arise during approval and/or there is a need for more information from the registrant, a notification can be sent to the registrant to update or supply additional information through the registration process and re-submit the request to register. Additionally or alternatively, a collaboration between an administrator, manager, or other authorized user can be initiated via email, chat, video or web conferencing, or any other of a variety of different media.

Stated another way, self-registration of registrants such as potential suppliers or bidders for availability in a process managed by an enterprise application can comprise maintaining a set of pre-defined templates 332 related to an on-boarding process, for example executed by the registration module 320, of the enterprise application 310. Each template 332 can comprise a set of information that is fixed and a set of information that is configurable. One of the pre-defined templates 332 can be updated by the registration module 320 with user defined information, for example received through the administration user interface 325, to create one or more configured templates 334. Each of the configured templates 334 related to a particular registration context. In response to a request from a registrant to register, for example received through the registration user interface 335, one of the configured templates 334 can be selected by the registration module 320 based on a context in which the request from the registrant is made. The registration module 320 can perform the on-boarding process using the selected configured template 334. The on-boarding process can comprise a sequence of pre-defined train stops for collecting information, for example through the registration user interface 335, from the registrant making the request to register. The information collected at each train stop can depend upon the set of information that is fixed and a set of information that is configurable within the selected configurable template 334. The registration data collected from the registrant by the registration module 320 during the on-boarding process can be submitted for approval, for example by presenting it to an administrator or other user through the administration user interface 325 or another interface. Upon approval of the registration data, the registrant can be added as available, for example by adding a record to the supplier information.

Figure 4:
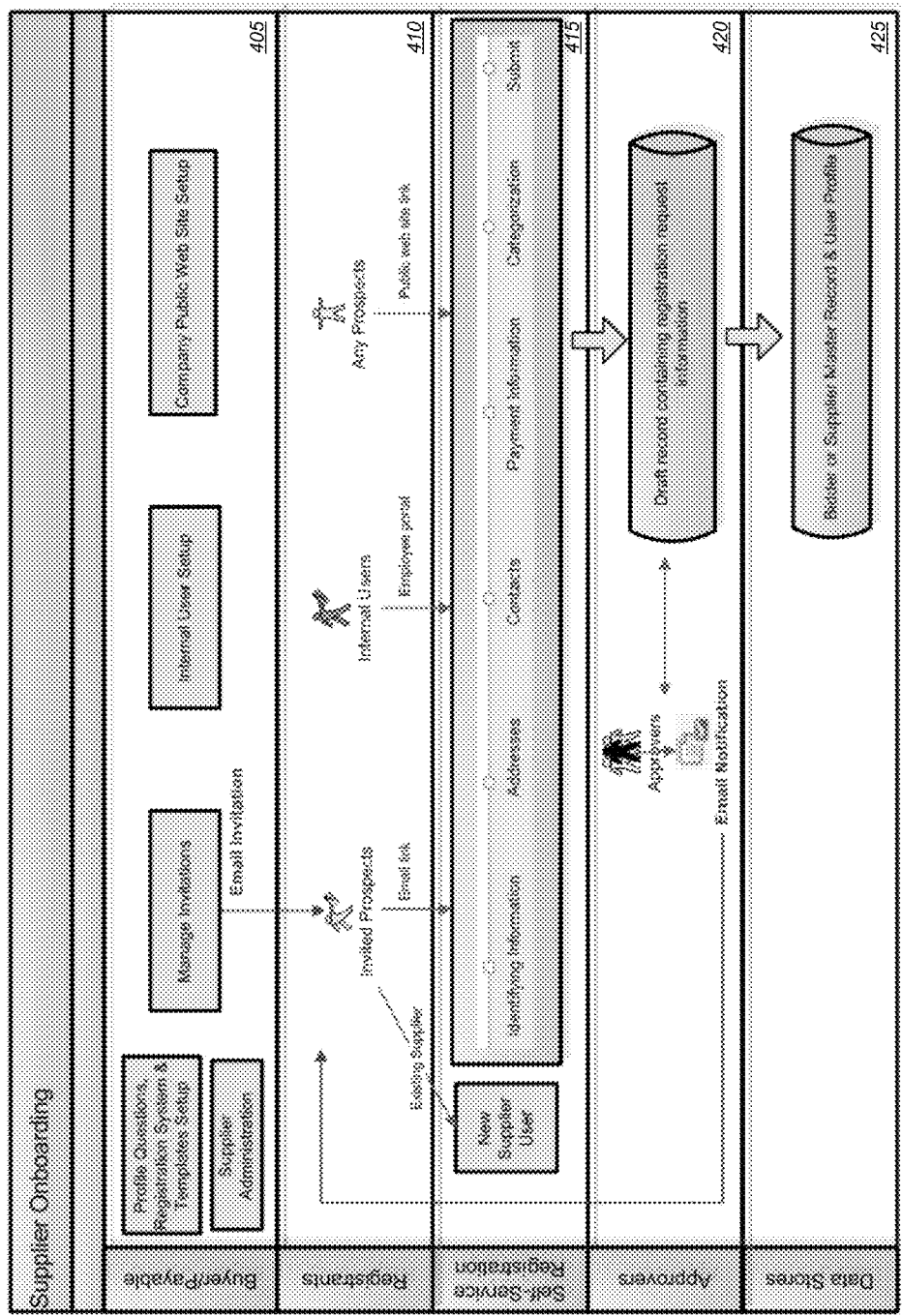
FIG. 4 is a flowchart illustrating a high-level an exemplary supplier on-boarding process using configured templates according to one embodiment of the present invention.

FIG. 4 is a flowchart illustrating at a high-level an exemplary supplier on-boarding process using configured templates according to one embodiment of the present invention. As illustrated in this example, self-registration of registrants for availability in a process managed by an enterprise application can comprise maintaining 425 a set of pre-defined templates related to an on-boarding process of the enterprise application. Each template can comprise a set of information that is fixed and a set of information that is configurable. For example, the set of information that is configurable can include but is not limited to one or more of information related to determining an identity of the registrant, information related to determining an address of the registrant, information related to determining contact information for the registrant, information related to determining payment information for the registrant, information related to determining product categories for the registrant, information related to terms and conditions for the registrant, etc.

One or more of the pre-defined templates can be updated 405 with user defined information to create one or more configured templates. Creating 405 the configured templates can be performed by an administrator, buyer, accounts payable manager, or other user through an administrative interface such as described above. Such an interface might also provide functions for administering suppliers, managing invitations to suppliers, managing internal user setup, managing of a company's website, etc. Updating 405 the one or more of the pre-defined templates can comprise presenting, through the interface, information from the pre-defined template, receiving selections of fields of the information that is configurable to either hide or present to a registrant during the on-boarding process, and/or receiving indications of changes to fields of the information that are configurable. These changes can be saved in the maintained 425 set of templates and other information.

In response to a request 410 from a registrant to register, at least one of the configured templates can be selected based on a context in which the request from the registrant is made. For example, the request from the registrant can be received in response to an invitation to register sent to the registrant. In other cases, the request from the registrant, who may be internal or external to the company, can be self-initiated by the registrant, e.g., by accessing an internal/private or external/public company webpage. The context in which the request is made can be based on one or more of a location of the registrant, a type of the registrant, an industry of the registrant, whether the registrant was invited to register, or whether the registrant is self-initiating the request to register.

The on-boarding process can be performed 415 using the selected at least one configured template. The on-boarding process can comprise a sequence of pre-defined train stops for collecting information from the registrant making the request to register. The information collected at each train stop can depend upon the set of information that is fixed and the set of information that is configured within the template. Information collected can include but is not limited to one or more of information related to determining an identity of the registrant, information related to determining an address of the registrant, information related to determining contact information for the registrant, information related to determining payment information for the registrant, information related to determining product categories for the registrant, information related to terms and conditions for the registrant, etc.

The registration data collected from the registrant during the on-boarding process can be submitted 420 for approval. For example, an approval process can include but is not necessarily limited to presenting the collected registrant information to an administrator or other user through the administration user interface or another interface. Upon approval 420 of the registration data, the registrant information can be added to the maintained data 425 thereby making the registrant available in the process managed by an enterprise application.

Figure 5:
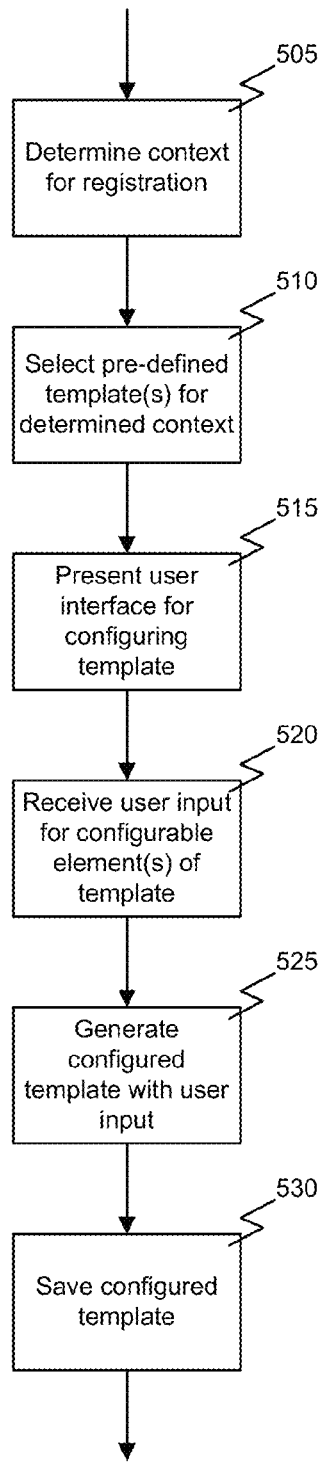
FIG. 5 is a flowchart illustrating an exemplary process for configuring one or more templates for use in a supplier on-boarding process according to one embodiment of the present invention.

FIG. 5 is a flowchart illustrating an exemplary process for configuring one or more templates for use in a supplier on-boarding process according to one embodiment of the present invention. In this example, updating one or more of the pre-defined templates with user defined information to create one or more configured templates can comprise determining 505 a context for registration to be updated and selecting 510 one of the pre-defined templates based on the determined context to be updated. A user interface for configuring the selected one or more pre-defined templates can be presented 515 and user inputs related to at least some of the set of information that is configurable in the one or more selected pre-defined templates can be received 520 through the user interface. The one or more configured templates can be generated 525 based on the one or more selected pre-defined templates and the received user inputs. The generated one or more configured templates can be saved 530 for use when registering a supplier, bidder, or other registrant within the particular context applicable to that registrant.

Figure 6:
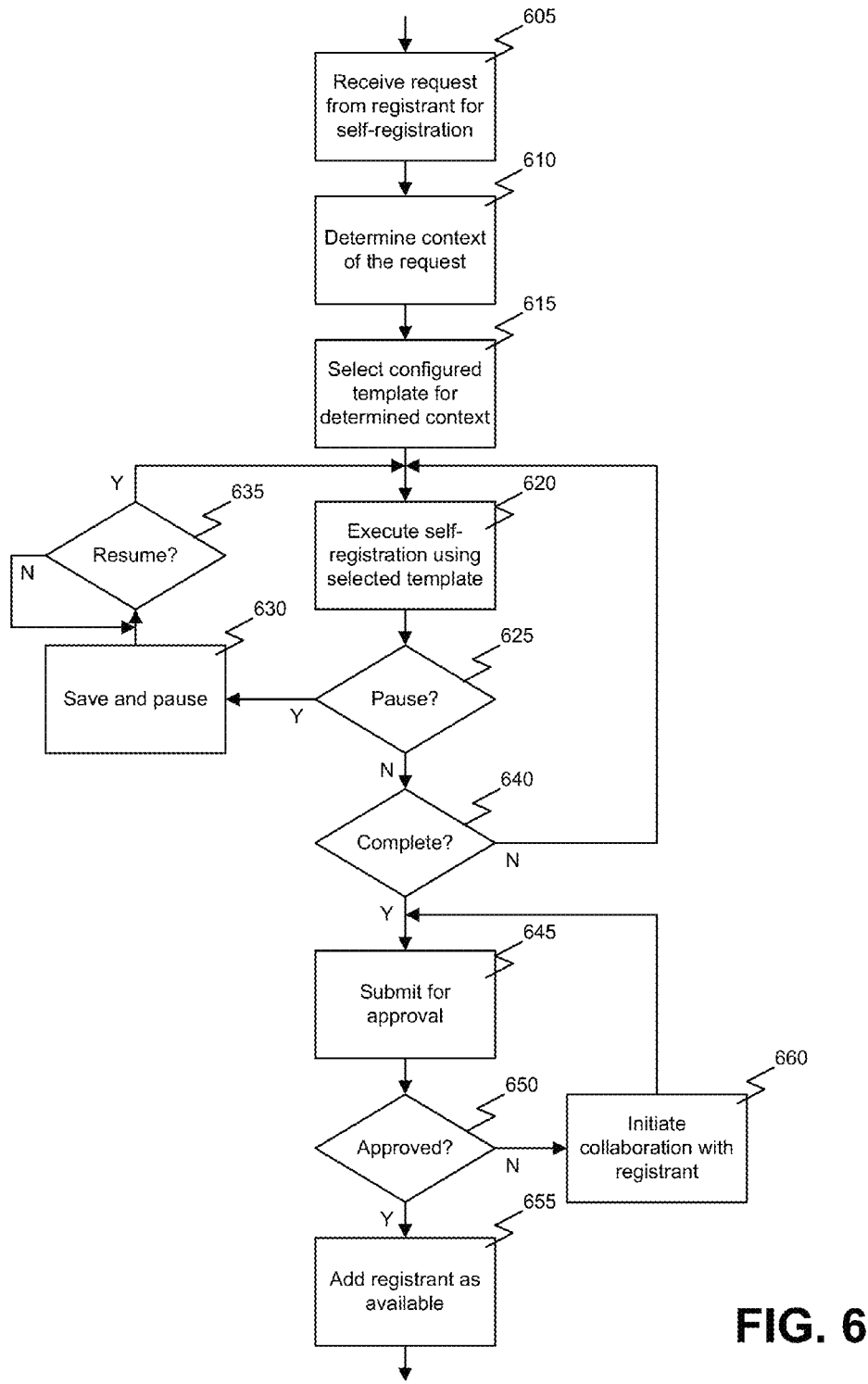
FIG. 6 is a flowchart illustrating an exemplary supplier on-boarding process using configured templates according to one embodiment of the present invention.

FIG. 6 is a flowchart illustrating an exemplary supplier on-boarding process using configured templates according to one embodiment of the present invention. In this example, performing the on-boarding process using the selected configured template can comprise receiving 605 the request from the registrant and determining 610 the context of the request. The context can be based on one or more of the request, the registrant making the request, a manner in which the request is initiated, etc. The configured template selecting 615 based on the determined context of the request and registration data can be collected 620 from the registrant through the on-boarding process and based on the selected configured template.

In some cases, a request from the registrant to pause the on-boarding process can be detected 625. In response to the request 625 from the registrant to pause the on-boarding process, the process can be paused 630 by saving collected registration data, issuing an identifier to the registrant, and stopping the on-boarding process. The identifier can comprise any number, name, or other information used to identify the registrant and the process completed thus far so that the registrant can later return and re-start the process where paused. Then, in response to a request 635 from the registrant to restart the paused on-boarding process that includes the issued identifier, the on-boarding process can be restarted 620 with the saved collected registration data.

Upon completion 640 of the on-boarding process, the registration data collected from the registrant during the on-boarding process can be submitted 645 for approval. Upon approval 650 of the registration data, the registrant can be added 655 as available in the process managed by an enterprise application. In some cases, in response to a failure to approve 650 the submitted registration data collected from the registrant during the on-boarding process, a collaboration can be initiated 660 with the registrant. For example, the collaboration may comprise an email exchange, a chat session, an online video or web conference, or any other form of communication. Regardless of the exact channel and format of communication, additional registration data collected from the registrant through the collaboration. The registration data collected from the registrant during the on-boarding process with the additional information can then be re-submitted 645 for approval.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for supporting self-registration of registrants for availability in a process managed by an enterprise application, the method comprising:

maintaining a set of pre-defined templates related to an on-boarding process of the enterprise application, each template comprising a set of information that is fixed and a set of information that is configurable;

updating one or more of the pre-defined templates with user defined information to create one or more configured templates, each of the configured templates related to a particular context;

in response to a request from a registrant to register, selecting one of the configured templates based on a context in which the request from the registrant is made;

performing the on-boarding process using the selected configured template, wherein the on-boarding process comprises a sequence of pre-defined train stops for collecting information from the registrant making the request to register and wherein the information collected at each train stop depends upon the set of information that is fixed and a set of information that is configurable within the template.

2. The method of claim 1, wherein the set of information that is configurable comprises one or more of information related to determining an identity of the registrant, information related to determining an address of the registrant, information related to determining contact information for the registrant, information related to determining payment information for the registrant, information related to determining product categories for the registrant, or information related to terms and conditions for the registrant.

3. The method of claim 2, wherein updating one or more of the pre-defined templates comprises selecting fields of the information that is configurable to either hide or present to a registrant during the on-boarding process.

4. The method of claim 2, wherein updating one or more of the pre-defined templates comprises changing fields of the information that is configurable.

5. The method of claim 1, wherein the request from the registrant is received in response to an invitation to register sent to the registrant.

6. The method of claim 1, wherein the request from the registrant is self-initiated by the registrant.

7. The method of claim 1, wherein the context in which the request is made is based on one or more of a location of the registrant, a type of the registrant, an industry of the registrant, whether the registrant was invited to register, or whether the registrant is self-initiating the request to register.

8. The method of claim 1, wherein updating one or more of the pre-defined templates with user defined information to create one or more configured templates comprises:
 determining a context for registration to be updated;
 selecting one or more of the pre-defined templates based on the determined context to be updated;
 presenting a user interface for configuring the selected one or more pre-defined templates;
 receiving user inputs through the user interface and related to at least some of the set of information that is configurable in the one or more selected pre-defined templates;
 generating the one or more configured templates based on the one or more selected pre-defined templates and the received user inputs; and
 saving the generated one or more configured templates.

9. The method of claim 1, wherein performing the on-boarding process using the selected configured template comprises:
 receiving the request from the registrant;
 determining the context of the request based on one or more of the request, the registrant making the request, or a manner in which the request is initiated;
 selecting the configured templates based on the determined context of the request;
 collecting registration data from the registrant through the on-boarding process and based on the selected configured template;
 submitting the registration data collected from the registrant during the on-boarding process for approval; and
 upon approval of the registration data, adding the registrant as available in the process managed by an enterprise application.

10. The method of claim 9, wherein performing the on-boarding process using the selected configured template further comprises:
 prior to submitting the registration data collected from the registrant during the on-boarding process for approval, detecting a request from the registrant to pause the on-boarding process;
 in response to the request from the registrant to pause the on-boarding process, saving collected registration data, issuing an identifier to the registrant, and stopping the on-boarding process; and
 in response to a request from the registrant to restart the paused on-boarding process that includes the issued identifier, restarting the on-boarding process with the saved collected registration data.

11. The method of claim 9, wherein performing the on-boarding process using the selected configured template further comprises:
 in response to a failure to approve the submitted registration data collected from the registrant during the on-boarding process, initiating a collaboration with the registrant;
 collecting additional registration data from the registrant through the collaboration; and
 re-submitting the registration data collected from the registrant during the on-boarding process with the additional information for approval.

12. A system comprising:
 a processor; and
 a memory coupled with and readable by the processor and storing a set of instructions which, when executed by the processor, causes the processor to support self-registration of registrants for availability in a process managed by an enterprise application by:
  maintaining a set of pre-defined templates related to an on-boarding process of the enterprise application, each template comprising a set of information that is fixed and a set of information that is configurable;
  updating one or more of the pre-defined templates with user defined information to create one or more configured templates, each of the configured templates related to a particular context;
  in response to a request from a registrant to register, selecting one of the configured templates based on a context in which the request from the registrant is made;
  performing the on-boarding process using the selected configured template, wherein the on-boarding process comprises a sequence of pre-defined train stops for collecting information from the registrant making the request to register and wherein the information collected at each train stop depends upon the set of information that is fixed and a set of information that is configurable within the template.

13. The system of claim 12, wherein the set of information that is configurable comprises one or more of information related to determining an identity of the registrant, information related to determining an address of the registrant, information related to determining contact information for the registrant, information related to determining payment information for the registrant, information related to determining product categories for the registrant, or information related to terms and conditions for the registrant.

14. The system of claim 13, wherein updating one or more of the pre-defined templates comprises selecting fields of the information that is configurable to either hide or present to a registrant during the on-boarding process.

15. The system of claim 13, wherein updating one or more of the pre-defined templates comprises changing fields of the information that is configurable.

16. The system of claim 12, wherein the context in which the request is made is based on one or more of a location of the registrant, a type of the registrant, an industry of the registrant, whether the registrant was invited to register, or whether the registrant is self-initiating the request to register.

17. The system of claim 12, wherein updating one or more of the pre-defined templates with user defined information to create one or more configured templates comprises:
- determining a context for registration to be updated;
- selecting one or more of the pre-defined templates based on the determined context to be updated;
- presenting a user interface for configuring the selected one or more pre-defined templates;
- receiving user inputs through the user interface and related to at least some of the set of information that is configurable in the one or more selected pre-defined templates;
- generating the one or more configured templates based on the one or more selected pre-defined templates and the received user inputs; and
- saving the generated one or more configured templates.

18. The system of claim 12, wherein performing the on-boarding process using the selected configured template comprises:
- receiving the request from the registrant;
- determining the context of the request based on one or more of the request, the registrant making the request, or a manner in which the request is initiated;
- selecting the configured templates based on the determined context of the request;
- collecting registration data from the registrant through the on-boarding process and based on the selected configured template;
- submitting the registration data collected from the registrant during the on-boarding process for approval; and
- upon approval of the registration data, adding the registrant as available in the process managed by an enterprise application.

19. The system of claim 18, wherein performing the on-boarding process using the selected configured template further comprises:
- prior to submitting the registration data collected from the registrant during the on-boarding process for approval, detecting a request from the registrant to pause the on-boarding process;
- in response to the request from the registrant to pause the on-boarding process, saving collected registration data, issuing an identifier to the registrant, and stopping the on-boarding process; and
- in response to a request from the registrant to restart the paused on-boarding process that includes the issued identifier, restarting the on-boarding process with the saved collected registration data.

20. The system of claim 18, wherein performing the on-boarding process using the selected configured template further comprises:
- in response to a failure to approve the submitted registration data collected from the registrant during the on-boarding process, initiating a collaboration with the registrant;
- collecting additional registration data from the registrant through the collaboration; and
- re-submitting the registration data collected from the registrant during the on-boarding process with the additional information for approval.

* * * * *